United States Patent
Chow

(10) Patent No.: US 9,609,271 B2
(45) Date of Patent: Mar. 28, 2017

(54) SYSTEM FOR LOCATING A POSITION OF LOCAL OBJECT FROM REMOTE SITE

(71) Applicant: Ching-Kay Chow, San Jose, CA (US)

(72) Inventor: Ching-Kay Chow, San Jose, CA (US)

(*) Notice: Subject to any disclaimer, the term of this patent is extended or adjusted under 35 U.S.C. 154(b) by 0 days.

(21) Appl. No.: 14/843,693

(22) Filed: Sep. 2, 2015

(65) Prior Publication Data
US 2016/0065896 A1 Mar. 3, 2016

Related U.S. Application Data

(60) Provisional application No. 62/044,840, filed on Sep. 2, 2014.

(51) Int. Cl.
*H04N 7/14* (2006.01)

(52) U.S. Cl.
CPC .................................. *H04N 7/147* (2013.01)

(58) Field of Classification Search
CPC ........................................................ H04N 7/14

USPC ..................... 348/14.01, 14.03, 14.07, 14.16
See application file for complete search history.

(56) References Cited

U.S. PATENT DOCUMENTS

2015/0256793 A1* 9/2015 Pycock ............... H04L 12/1813
348/14.07

* cited by examiner

*Primary Examiner* — Olisa Anwah

(57) ABSTRACT

Systems and methods provide location of an object via video conferencing. The systems and methods may be useful for applications that require remote assistance from an individual to help another individual locate an object or a feature within an image displayed on screen. The user of a local device may view the remote image for context of the environment. In some embodiments, the local user may help direct the remote user by directions to zoom in or out of the displayed image and may provide a frame to guide the remote user. A position in the remote image shown in the remote device is activated and displayed by the local user as an icon to help pinpoint the object location for the remote user.

2 Claims, 4 Drawing Sheets

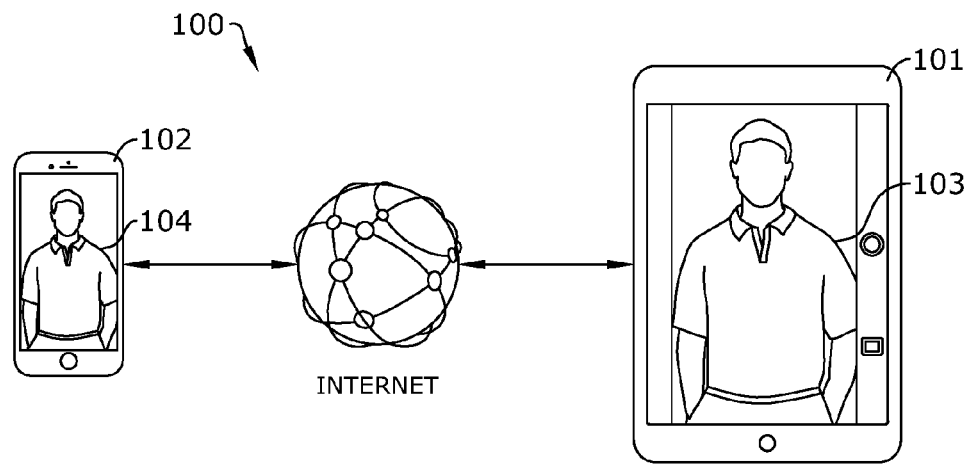
FIG.1
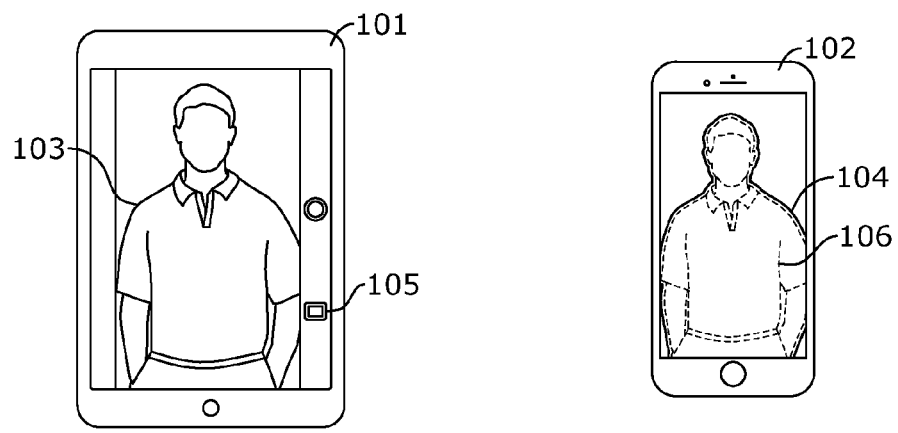 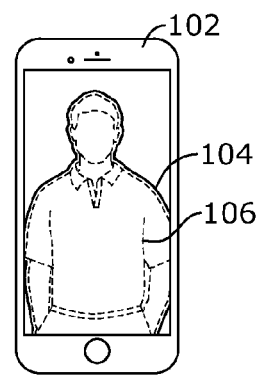
FIG.2 FIG.3

SYSTEM FOR LOCATING A POSITION OF LOCAL OBJECT FROM REMOTE SITE

CROSS-REFERENCE TO RELATED APPLICATIONS

This application claims benefit under 35 U.S.C. §119(e) of U.S. Provisional Application having Ser. No. 62/044,840 filed Sep. 2, 2014, which is hereby incorporated by reference herein in its entirety.

BACKGROUND

The embodiments herein relate generally to systems providing location of an object from a remote site.

For many, many years, it has been a commonly difficult practice for people to accurately locate the position of a remote object. Typically, verbal methods are used to communicate and to locate the precise position of an object from a remote location albeit ineffectively. However, verbal commands are subject to the skill of the person providing guidance and may often omit the context of an environment which takes time to pinpoint the position of the object. For example, an individual may need assistance in identifying or diagnosing an automotive breakdown under the hood of a car. Absent live in-person assistance, currently, the individual may only be able to call someone who can talk them through the parts of the engine. However for the automotive novice, the simple task of identifying one engine part over another is formidable. Even should the individual show by live video the engine compartment, the remote helper is still limited to verbal cues in providing assistance to identify objects at the remote location.

Embodiments of the invention improve the process of effectively locating the precise position of an object from a remote location.

SUMMARY

A computer program product is disclosed for remote position indication of an object in an electronic display. The computer program product comprises a non-transitory computer readable storage medium having computer readable program code embodied therewith. The computer readable program code is configured to: provide a video enabled conference between a local device and a remote device; display a remote image in the remote device as a local image in the local device; receive a user input of interaction pinpointing a position in the displayed local image in the local device; and provide an icon displayed at a same position in the remote image of the remote device as the pinpointed position within the local image.

An electronic computing device comprises an electronic display configured to wirelessly receive and locally display in said electronic computing device a remote image displayed in a remote electronic computing device; a processor configured to: provide a live video enabled conference between said electronic computing device and the remote electronic computing device; receive, during the live video conference, a user input of interaction pinpointing a position in the locally displayed remote image in the local device; and wirelessly transmit an icon displayed at a same position in the displayed remote image of the remote device as the pinpointed position within the locally displayed image in said electronic computing device.

BRIEF DESCRIPTION OF THE FIGURES

The detailed description of some embodiments of the invention is made below with reference to the accompanying figures, wherein like numerals represent corresponding parts of the figures.

FIG. 1 is a schematic showing interaction of a local device and a remote device during a videoconference according to embodiments of the subject technology.

FIGS. 2-5 show an exemplary interaction between the local device and the remote device where a position in an object shown in local device can be pinpointed at the same position in an image of the object in the remote device according to embodiments of the subject technology.

DETAILED DESCRIPTION OF CERTAIN EMBODIMENTS

Handheld mobile devices, such as mobile phones, tablets or laptop computers, are becoming increasingly useful for communication. With video and audio communication locating a position of an object from remote site can be done but an effective solution has not previously been proposed. Embodiments of the present invention provide an improved system and method for helping locate the position of an object guided from a remote site. In general, the system comprises a client application in Device A at location X and a server application in a Device B at location Y which communicate with each other between two different locations via wireless or internet connectivity.

Figure 7:
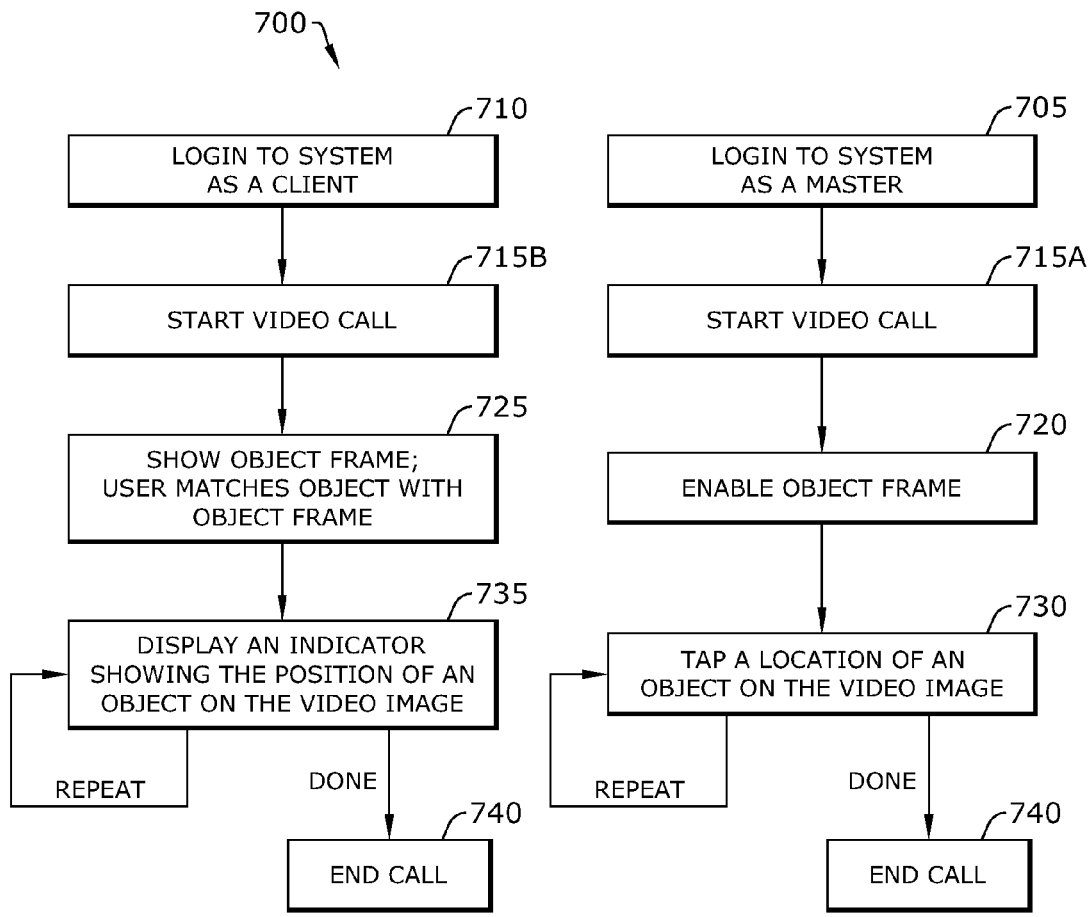
FIG. 7 is a flowchart of a process for locating a position of an object in a remote image according to embodiments of the subject technology.

Referring now to FIGS. 1-5 (a sequence of interaction between a local device 101 and a remote device 102 is shown) concurrently with FIG. 7, an exemplary system 100 and process 700 for locating a position of an object in a remote image in the remote device 102 are shown according to exemplary embodiments of the subject technology. As may be appreciated, embodiments of the invention may be useful in many applications where one user needs guidance as to finding the exact location of an object or a feature in the object. Examples of useful remote guidance applications that can benefit from aspects of the subject technology include automotive repair, physician's assistance, teaching, lost item identification, etc. For sake of illustration, the below disclosure is described in the context of a physician/patient interaction however it will be understood that other applications such as the ones described above may be used similar to the description below.

As shown in FIGS. 1-5, a remote user (patient) may wish to consult with a physician via video teleconference. As used herein, the term "local" refers to the individual or device receiving an image from another individual (for example, a physician) and "remote" refers to the individual and device needing assistance locating a position in an image (for example, patient). However it will be understood that the terms "local" and "remote" may be interchangeable as needed depending on the individual's perspective in the system or process. For example, in some instances, the "local user" may be the patient and the "remote user" may be the physician. In addition, the local device 101 may be the master device and the remote device 102 may be a slave device receiving input from the master device for display.

Reference numerals in parentheses refer to blocks associated with actions in the process 700.

In an exemplary use, during a video teleconference, the remote user may be receiving a remotely administered medical exam. The physician may wish to guide the remote user to palpate or position medical instruments at certain locations of the patient's body for providing a diagnosis. The remote device user unlikely has the experience or understanding on the correct location to position a medical instrument. Once the local device user logs in (705) and the remote device user logs in (710), a video conference between both parties may be initiated (715*a*; 715*b*). A local image 103 of a remote image 104 (for example, the remote user's image) (sometimes referred to as the remote object) is displayed on respective devices 101 and 102. The physician may want the remote user to place an electronic stethoscope to the patient's heart to hear a heartbeat. The local user (physician) controlling the local device 101 (FIG. 2) at location X may activate (720) an object "frame" control feature (button) 105 which enables the control of a frame (or outline) 106. The frame 106 may be superimposed (725) on the remote image 104 shown in the remote user's display. The remote user may move the remote device 102 to display the frame 106 over the remote image 104 (FIG. 3). In some embodiments, the frame or outline 106 may represent predetermined forms (for example, an anatomical outline or a stored outline of an apparatus) providing scale and context to help the remote user in identifying the rough location of what is being seen. The local user on local device 101 may pinpoint (730) (for example by tapping on a touch sensitive display) a position 107 on local image 103 which will display (735) an indicator, icon, or other symbol 108 showing the same position 107 on the local image 103 on remote image 104 of remote device 102. The actions of pinpointing locations 107 on the local device 101 and showing an indicator on the remote image in remote device 102 may be repeated as desired until the conference is ended (740).

In some embodiments, the frame 106 may be customizable so that the local device 101 may present the remote device 102 with a general frame of reference within an image. For example, if a user were asking his or her spouse where a set of keys were stored at their residence, the spouse from the local device 101 could see a zoomed out picture of a room in the residence. The spouse from the local device 101 may draw a frame 106 indicating the general area of the keys and may tap to show the specific location within the frame 106. In another example, embodiments of the present invention may help in repair work. For example, during an auto repair session, a mechanic at a local device 101 may frame an area under the hood of a car and may tap which automotive element needs to be checked or removed.

Figure 4:
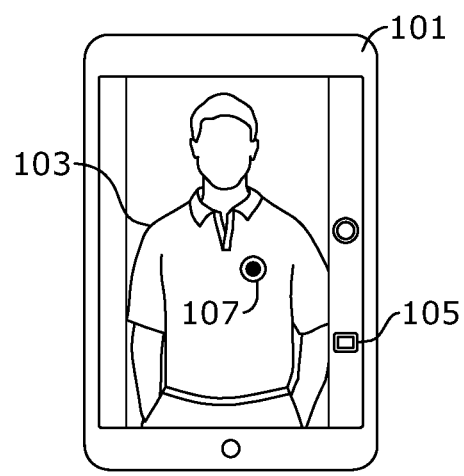
Figure 5:
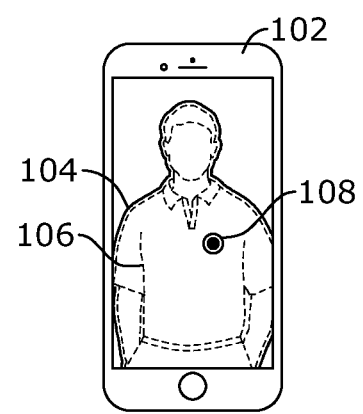
Figure 6:
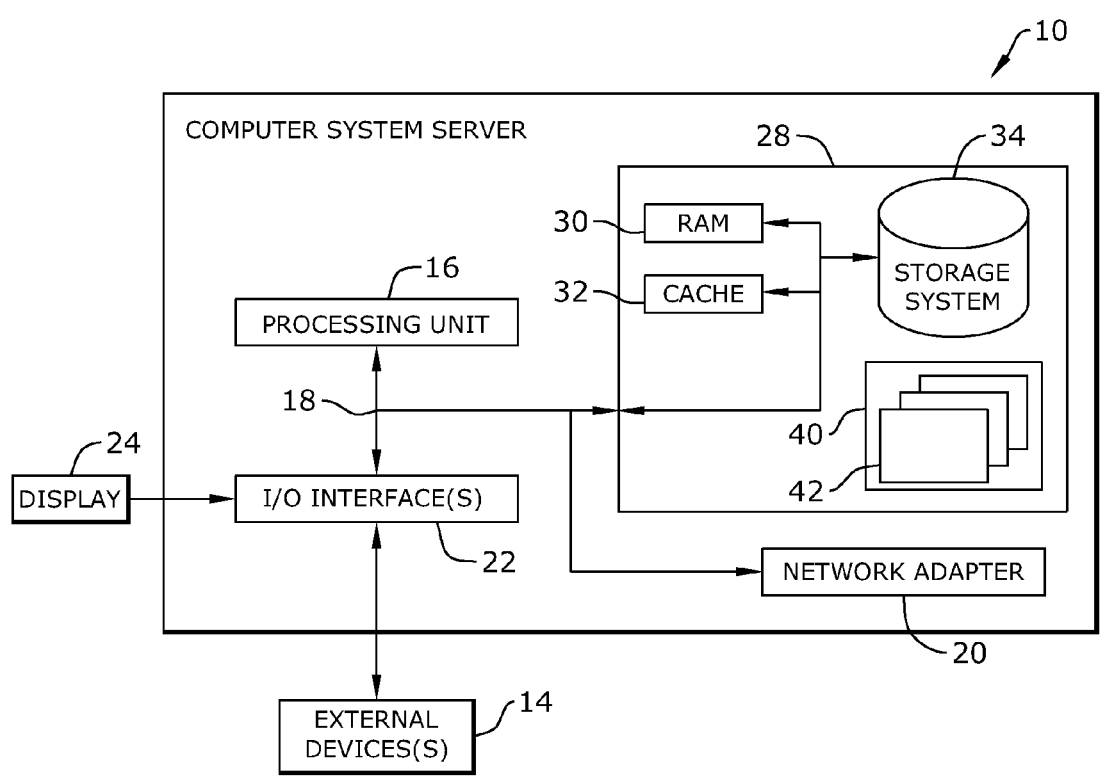
FIG. 6 is a block diagram of a computer system/server according to an embodiment of the invention.

Referring now to FIG. 6, a schematic of an example of a computer system/server 10 is shown. In the description above, the local device 101, the remote device 102, and any intermediary computing devices may be described in and operate in terms of the computer system/server 10. The computer system/server 10 is shown in the form of a general-purpose computing device. The components of the computer system/server 10 may include, but are not limited to, one or more processors or processing units 16, a system memory 28, and a bus 18 that couples various system components including the system memory 28 to the processor 16.

In some embodiments, the computer system/server 10 may be a cloud computing node connected to a cloud computing network (not shown). The computer system/server 10 may be for example, personal computer systems, tablet devices, mobile telephone devices, server computer systems, handheld or laptop devices, multiprocessor systems, microprocessor-based systems, set top boxes, programmable consumer electronics, network PCs, wearable computing devices, and distributed cloud computing environments that include any of the above systems or devices, and the like. The computer system/server 10 may be described in the general context of computer system executable instructions, such as program modules, being executed by a computer system (described for example, below). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. For example, the program modules 42 may execute the steps for enabling video conferencing (in some embodiments, live streaming), providing the frame 106 (FIG. 3), receiving local user input for pinpointing an object or feature in an image, and providing an icon or other video feature displaying the pinpointed location of the object or feature on the remote device as described above.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:
1. An electronic computing device, comprising:
an electronic display configured to wirelessly receive and locally display in said electronic computing device a remote image displayed in a remote electronic computing device;
a processor configured to:
provide a live video enabled conference between said electronic computing device and the remote electronic computing device;
provide a digital frame in the shape of a predetermined anatomical object enabled by the local device superimposed onto the displayed remote image of the remote device;
receive, during the live video conference, a user input of interaction pinpointing a position in the locally displayed remote image in the local device; and
wirelessly transmit an icon displayed at a same position in the displayed remote image of the remote device as the pinpointed position within the locally displayed image in said electronic computing device, wherein the icon is displayed within the frame in the shape of the predetermined anatomical object.
2. The electronic computing device of claim 1, wherein the electronic display is a touch sensitive enabled display.

* * * * *